United States Patent [19]
Fauran et al.

[11] 3,883,521
[45] May 13, 1975

[54] 3-SUBSTITUTED-5-AMINOMETHYL-6-CARBETHOXY(OXAZINO [5',6' E INDOLES).

[75] Inventors: Claude Fauran; Michel J. Turin; Gerard J. Huguet; Guy M. Raynaud, all of Paris; Bernard M. Pourrias, Meudon La Foret, all of France

[73] Assignee: Delalande S.A., Courbevoie, France

[22] Filed: May 24, 1973

[21] Appl. No.: 363,535

[30] Foreign Application Priority Data
June 8, 1972 France.............................. 72.20644

[52] U.S. Cl.. 260/244 R; 260/268 BC; 260/293.61; 260/326.14; 424/248
[51] Int. Cl............................................ C07d 87/06
[58] Field of Search................... 260/244 R, 268 TR Primary Examiner—Donald G. Daus
Assistant Examiner—Jose Tovar
Attorney, Agent, or Firm—Woodhams, Blanchard & Flynn

[57] ABSTRACT

A compound of the formula

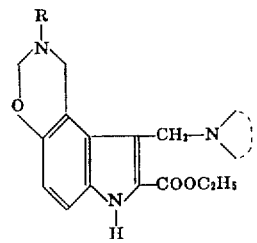

wherein N is pyrrolidino, piperidino or piperazino N'-substituted with isopropylamino carbonyl methyl, pyrrolidino carbonyl methyl or ethylacetate, and R is a hydrocarbon radical having 1 to 6 carbon atoms, optionally substituted with a hydroxyl or tertiary amino group. The compounds are prepared by reacting 2-carbethoxy-3-substituted-5-hydroxy indole with formaldehyde and an amine of the formula $RNH_2$. The compounds possess analgesic, antiinflammatory, hypotensive, antihypertensive, vasodilatatory, respiratory analeptic, sedative anticonvulsant, anxiolytic, bronchodilatatory, spasmolytic and diuretic properties.

14 Claims, No Drawings

3-SUBSTITUTED-5-AMINOMETHYL-6-CARBETHOXY(OXAZINO [5',6' E INDOLES).

The present invention relates to novel 3-substituted-5-aminomethyl-6-carbethoxy [oxazino(5',6'e) indoles], their process of preparation and their therapeutic application.

The compounds according to the invention correspond to the general formula:

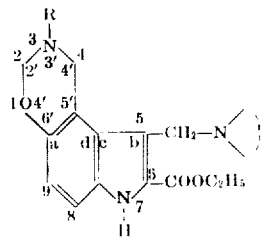
(I)

in which:

represents a heterocyclic radical selected from: pyrrolidino, piperidino and piperazino N'-substituted by an isopropylamino-carbonyl-methyl, a pyrrolidino-carbonylmethyl or an ethyl acetate residue; and R represents a hydrocarbon chain having 1 to 6 carbon atoms, which may be straight-chained, branched or cyclic, saturated or unsaturated, and optionally carries an alcohol or tertiary amine function.

The process according to the invention consists in reacting a mass of 2-carbethoxy-5-hydroxy indole, suitably substituted in the 3-position, corresponding to the general formula:

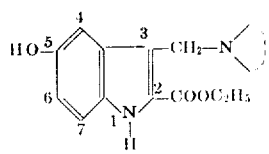
(II)

with two moles of formaldehyde and one mole of a primary amine of formula:

R N H$_2$ (III)

the radicals:

and R having in these formulas the same signification as in formula (I).

The starting compounds corresponding to formula (III) may be obtained according to the procedure described by M. JULIA and J. Y. LALLEMAND in C.R. Acad. Sc. Paris, t 267 (1506), that is to say by operating, in a first stage, an aminomethylation reaction (Mannich reaction) on 5-benzyloxy-2-ethoxycarbonyl indole of formula:

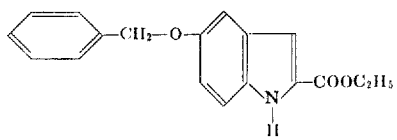
(IV)

with the aid of formol and an amine of formula (V):

$$H-N\langle \quad (V)$$

in which

has the same signification as in formula (I), and then, in a second stage, to debenzylate the Mannich base so obtained of formula:

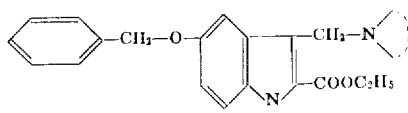
(VI)

The following preparation is given by way of example to illustrate the invention.

EXAMPLE

3-Isopropyl-5-[4''-(isopropylaminocarbonylmethyl)piperazinomethyl]-6-ethoxycarbonyl-[2H - 4 H oxazino (5',6'e) indole].

Code No: 71234

7c.c. of an aqueous solution of 40% formaldehyde is dissolved in 60 cc of alcohol, and the mixture is cooled to −10°C. 4g of isopropylamine in solution in 20 c.c. of alcohol is then progressively added thereto. Then 16g of 3-(4'-isopropylaminocarbonylmethyl-1'-piperazinomethyl)-2-carbethoxy-5-hydroxy indole is introduced into the mixture. The mixture is then refluxed.

The product which precipitates is dried after cooling, and then recrystallised from acetone.

| Melting point | = 204°C |   |   |   |
|---|---|---|---|---|
| Yield | = 43% |   |   |   |
| Empirical formula | = $C_{26}$ | $H_{39}$ | $N_5$ | $O_4$ |
| Elementary analysis: |   | C | H | N |
| Calculated % |   | 64.30 | 8.10 | 14.42 |
| Found % |   | 64.20 | 8.19 | 14.53 |

The compounds listed in the following Table I have been prepared by the same operational procedure.

TABLE I

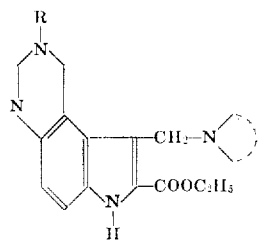

| Code No. | N⟨⟩ | R | Empirical formula | Molecular weight | Melting point, °C. | Yield, percent | Calculated C | Calculated H | Calculated N | Found C | Found H | Found N |
|---|---|---|---|---|---|---|---|---|---|---|---|---|
| 7127 | | —C$_6$H$_{11}$ | C$_{25}$H$_{35}$N$_3$O$_3$ | 425.55 | 192 | 39 | 70.56 | 8.29 | 9.88 | 70.49 | 8.21 | 10.07 |
| 7128 | N⟨⟩ | —CH(CH$_3$)$_2$ | C$_{22}$H$_{31}$N$_3$O$_3$ | 385.49 | 159 | 47 | 68.54 | 8.11 | 10.90 | 68.33 | 8.35 | 11.06 |
| 7188 | | —C$_3$H$_7$ | C$_{21}$H$_{29}$N$_3$O$_3$ | 371.46 | 164 | 28 | 67.90 | 7.87 | 11.31 | 67.74 | 8.18 | 11.27 |
| 71188 | | —C$_2$H$_5$ | C$_{20}$H$_{27}$N$_3$O$_3$ | 357.44 | 180 | 31 | 67.20 | 7.61 | 11.76 | 67.22 | 7.58 | 11.89 |
| 71189 | | —CH(CH$_3$)$_2$ | C$_{21}$H$_{29}$N$_3$O$_3$ | 371.46 | 150 | 63 | 67.90 | 7.87 | 11.31 | 67.88 | 7.97 | 11.47 |
| 71190 | | —CH$_2$—CH=CH$_2$ | C$_{21}$H$_{27}$N$_3$O$_3$ | 369.45 | 142 | 47 | 68.27 | 7.37 | 11.37 | 68.30 | 7.46 | 11.52 |
| 71206 | | —C$_6$H$_{11}$ | C$_{24}$H$_{33}$N$_3$O$_3$ | 411.52 | 159 | 67 | 70.04 | 8.08 | 10.21 | 70.29 | 8.00 | 10.35 |
| 71543 | N⟨⟩N—CH$_2$CONHCH(CH$_3$) | —(CH$_2$)$_2$N(C$_2$H$_5$)$_2$ | C$_{29}$H$_{46}$N$_6$O$_4$ | 542.70 | 210 | 49 | 64.18 | 8.54 | 15.49 | 64.28 | 8.67 | 15.63 |
| 71506 | | —C$_6$H$_{11}$ | C$_{29}$H$_{43}$N$_5$O$_4$ | 525.67 | 233 | 63 | 66.26 | 8.25 | 13.32 | 66.46 | 8.13 | 13.12 |
| 71519 | | —CH$_2$—CH=CH$_2$ | C$_{26}$H$_{37}$N$_5$O$_4$ | 483.59 | 205 | 45 | 65.47 | 7.71 | 14.48 | 64.39 | 7.76 | 14.44 |
| 71237 | | —CH(CH$_3$)$_2$ | C$_{27}$H$_{39}$N$_5$O$_4$ | 497.62 | 188 | 40 | 65.16 | 7.90 | 14.07 | 65.13 | 7.85 | 13.96 |
| 71534 | N⟨⟩N—CH$_2$CON⟨⟩ | —(CH$_2$)$_2$N(C$_2$H$_5$)$_2$ | C$_{30}$H$_{46}$N$_6$O$_4$ | 554.71 | 188 | 47 | 64.95 | 8.36 | 15.15 | 64.80 | 8.41 | 15.06 |
| 71542 | | —C$_6$H$_{11}$ | C$_{30}$H$_{43}$N$_5$O$_4$ | 537.68 | 200 | 62 | 67.01 | 8.06 | 13.03 | 66.81 | 8.03 | 12.93 |
| 71529 | | —CH$_2$—CH=CH$_2$ | C$_{27}$H$_{37}$N$_5$O$_4$ | 495.60 | 170 | 46 | 65.43 | 7.53 | 14.13 | 65.41 | 7.63 | 13.98 |
| 71236 | | —CH(CH$_3$)$_2$ | C$_{25}$H$_{36}$N$_4$O$_5$ | 472.57 | 169 | 55 | 63.54 | 7.68 | 11.86 | 63.57 | 7.54 | 11.81 |
| 71541 | | —(CH$_2$)$_2$N(C$_2$H$_5$)$_2$ | C$_{28}$H$_{43}$N$_5$O$_5$ | 529.66 | 117 | 42 | 63.49 | 8.18 | 13.22 | 63.62 | 8.20 | 13.05 |
| 71511 | N⟨⟩N—CH$_2$COOC$_2$H$_5$ | —C$_6$H$_{11}$ | C$_{28}$H$_{40}$N$_4$O$_5$ | 512.63 | 150 | 38 | 65.60 | 7.87 | 10.73 | 65.80 | 8.05 | 10.78 |
| 71512 | | —CH$_2$—CH=CH$_2$ | C$_{25}$H$_{34}$N$_4$O$_5$ | 470.55 | 153 | 53 | 63.81 | 7.28 | 11.91 | 63.62 | 7.35 | 11.71 |
| 71554 | | —(CH$_2$)$_2$OH | C$_{24}$H$_{34}$N$_4$O$_6$ | 474.54 | 143 | 31 | 60.74 | 7.22 | 11.81 | 60.57 | 7.28 | 11.64 |

The compounds of formula (I) have been studied on animals in the laboratory and have been shown to possess analgesic, antiinflammatory, hypotensive, antihypertensive, vasodilatatory, respiratory analeptic, sedative, anticonvulsivant, anxiolytic, bronchodilatatory, spasmolytic and diuretic properties.

1. Analgesic properties

The compounds of formula (I), administered by oral means to the mouse, are capable of reducing the number of painful stretchings caused by the intraperitoneal injection of acetic acid.

By way of examples, the results obtained with different compounds of formula (I) are listed in the following Table II.

TABLE II

| Code No. of compound tested | Dose administered (mg/kg/PO) | Percentage reduction of number of painful stretchings (%) |
|---|---|---|
| 7127 | 100 | 70 |
| 7128 | 100 | 75 |
| 7188 | 100 | 75 |
| 71188 | 50 | 70 |
| 71189 | 100 | 60 |
| 71190 | 50 | 60 |
| 71206 | 50 | 60 |
| 71234 | 100 | 70 |
| 71236 | 25 | 70 |
| 71237 | 100 | 45 |
| 71512 | 30 | 80 |
| 71529 | 100 | 65 |
| 71541 | 100 | 55 |
| 71554 | 100 | 55 |

2. Antiinflammatory properties

These properties are shown by a diminution of the local oedema caused by the sub-plantar injection of a phlogogenic agent, such as carraghenin, in the rat following the oral administration of compounds of formula (I).

By way of examples, the results obtained with different compounds of formula (I) are given in the following Table III:

TABLE III

| Code No. of compound tested | Dose administered (mg/kg/PO) | Percentage reduction of sub-plantar oedema (%) |
|---|---|---|
| 7128 | 100 | 30 |
| 71236 | 20 | 45 |
| 71512 | 12.5 | 70 |
| 71519 | 100 | 40 |
| 71554 | 100 | 60 |

3. Hypotensive properties

Administered by intraveinous means to the rat, the compounds of formula (I) cause a lowering of the arterial pressure.

By way of example, the following Table IV gives the results obtained with different compounds of formula (I).

TABLE IV

| Code No. of compound tested | Dose administered (mg/kg/IV) | Percentage reduction of arterial pressure (%) | Duration of effect (mn) |
|---|---|---|---|
| 7127 | 1 | ≅ 45 | 40 |
| 7128 | 1 | ≅ 20 | 15 |
| 71188 | 1 | ≅ 65 | 30 |
| 71189 | 1 | ≅ 50 | 30 |
| 71236 | 1 | ≅ 30 | 30 |
| 71519 | 2 | ≅ 65 | 40 |

4. Antihypertensive properties

The compounds of formula (I) administered orally into a hypertensive rat, are capable of reducing the systolic arterial pressure.

By way of examples, the results obtained by administration of different compounds of formula (I), are given in the following Table V:

TABLE V

| Code No. of compound tested | Dose administered (mg/kg/PO) | Percentage of animals having arterial pressure which is brought back to normal (%) |
|---|---|---|
| 71189 | 100 | 70 |
| 71234 | 200 | 35 |
| 71506 | 150 | 35 |
| 71519 | 200 | 50 |

5. Vasodilatatory properties

The compounds of formula (I) are capable of augmenting the flow of the coronary vessels of the isolated heart of a guinea-pig, when said compounds are added in the perfusion liquid of said organ.

By way of example Table VI indicates the results obtained with different compounds of formula (I).

TABLE VI

| Code no. of compound tested | Dose adminsitered in the perfusion liquid ($\mu$g/ml/mn) | Percentage augmentation of flow of isolated heart (%) |
|---|---|---|
| 71190 | 1 | 35 |
| 71206 | 1 | 75 |
| 71234 | 1 | 80 |
| 71506 | 2.5 | 60 |
| 71511 | 2.5 | 35 |
| 71512 | 0.5 | 40 |

6. Respiratory analeptic properties

The compounds of formula (I), administered by intraveinous or intraduodenal means to the anaesthetised guinea-pig, are capable of opposing the respiratory depression caused by morphine.

By way of example, the results obtained with different compounds of formula (I) are given in the following Table VII.

TABLE VII

| Code no. of compound tested | Dose administered | | Percentage augmentation of respiratory frequency (%) |
|---|---|---|---|
| 71188 | 2.5 | mg/kg/IV | 50 |
| 71190 | 5 | mg/kg/IV | 40 |
| 71234 | 10 | mg/kg/IV | 80 |
| 71534 | 5 | mg/kg/IV | 50 |
| 71554 | 2 | mg/kg/IV | 100 |
|  | 100 | mg/kg/ID | 25 |

It is to be noted, as well, that administration of 100mg/kg/ID of the compound of Code No. 71554 causes, in the anaesthetised guinea-pig, a percentage augmentation of the amplitude of respiratory movements equal to 45%.

7. Sedative properties

The compounds of formula (I), administered by oral means to the mouse, reduce the number of explorations in the evasion enclosure.

By way of example, the administration of 100mg/kg/PO of the compounds of code Nos. 7127 and 71541 produced a percentage reduction of the number of explorations in the evasion enclosure equal to 35% and 30% respectively.

8. Anticonvulsivant and anxiolytic properties

The compounds of formula (I) possess the property of inhibiting by oral means the mortality caused in a mouse by the administration of cardiazol.

By way of examples, the administration of 100mg/kg/PO of the compounds of code Nos. 7127 and 71542 produce a protection of 40% against the lethality of cardiazol.

9. Bronchodilatatory properties

Injected by intraveinous means, the compounds of formula (I) are capable of opposing the bronchoconstriction caused in the guinea-pig by the intraveinous injection of acetylcholine, and evaluated by the Konzett method.

By way of examples, the results obtained with different compounds of formula (I) are listed in the following Table VIII.

TABLE VIII

| Code No. of compound tested | Dose administered (μg/kg/IV) | Percentage inhibition of bronchoconstriction (%) |
|---|---|---|
| 71188 | 500 | 100 |
| 71206 | 2.5 | 50 |

10. Spasmolytic properties

The compounds of formula (I) introduced in the conserving medium, are capable of opposing the contractural action of barium chloride on the isolated duodenum of the rat. This activity is evaluated by taking papaverine as standard.

By way of examples, the activity of the compounds of code Nos. 71190, 71534 and 71541 is equal respectively to ½, 166 and ½ that of papaverine.

11. Diuretic properties

The compounds of formula (I), administered by oral means to the mouse simultaneously with a volume of 1ml of an isotonic solution of sodium chloride per 25g. of the corporeal weight of the mouse, are capable of provoking an augmentation of the volume of urine emitted by reference to control animals, the volume being measured for 4 hours following administration.

By way of example, the following Table IX gives the results obtained with different compounds of formula (I).

TABLE IX

| Code No. of compound tested | Dose administered (mg/kg/PO) | Percentage augmentation of urinary elimination (%) |
|---|---|---|
| 7127 | 20 | 50 |
| 7188 | 50 | 17 |
| 71189 | 20 | 50 |

From the doses indicated above and the results listed in the following Table X, it can be seen that the difference between the pharmacologically active dose and the lethal dose is sufficiently great to permit the compounds of formula (I) to be utilised in therapeutics.

TABLE X

| Code No. of compound tested | Dose administered (mg/kg/PO) | Percentage mortality |
|---|---|---|
| 7127 | 900 | ≅ 50 |
| 7128 | 1700 | ≅ 50 |
| 7188 | 800 | ≅ 50 |
| 71188 | 800 | ≅ 50 |
| 71189 | 1100 | ≅ 50 |
| 71190 | 650 | ≅ 50 |
| 71206 | 560 | ≅ 50 |
| 71234 | 2000 | ≅ 50 |
| 71236 | 350 | ≅ 50 |
| 71237 | 2000 | 0 |
| 71506 | 1200 | ≅ 50 |
| 71511 | 2000 | 0 |
| 71512 | 300 | ≅ 50 |
| 71519 | 1800 | ≅ 50 |
| 71529 | 2000 | 0 |
| 71534 | 1600 | ≅ 50 |
| 71541 | 1000 | ≅ 50 |
| 71542 | 2000 | 0 |
| 71554 | 850 | ≅ 50 |

The compounds of formula (I) are useful in the treatment of various pains, especially inflammatory pains, hypertensions, circulatory insufficiencies, respiratory insufficiencies, anxieties, visceral spasms, asthma and oedemas.

They may be administered by oral means in the form of tablets, dragees and gelules containing 25 to 400 mg of active ingredient (1 to 5 times a day) and by rectal means in the form of suppositories containing 25 to 250 mg of active ingredient (1 or 2 times a day).

Accordingly, the present invention relates to a therapeutic composition comprising a compound of the general formula (I) together with a therapeutically-acceptable carrier.

What we claim is:

1. A compound having the formula

[structural formula with R-N, indole ring with CH₂-N and -COOC₂H₅ substituents]

wherein R is alkyl having 1 to 6 carbon atoms, allyl, cyclohexyl, diethylamino ethyl or β-hydroxyethyl, and $-N\langle$ is [various piperazine and piperidine ring structures shown]

2. A compound as claimed in claim 1, in which $-N\langle$ is [piperazine-CH₂-CO-NH-CH(CH₃)₂ structure]

3. A compound as claimed in claim 1, in which $-N\langle$ is [ring-N-CH₂-CO-ring structure]

4. A compound as claimed in claim 1, in which $-N\langle$ is [piperazine-CH₂-COOC₂H₅ structure]

5. A compound as claimed in claim 1 in which R is ethyl, isopropyl, allyl or cyclohexyl.

6. A compound as claimed in claim 1 in which R is diethylamino ethyl radical or a β-hydroxyethyl.

7. A compound as claimed in claim 1, in which $-N\langle$ is [piperidine ring]

8. A compound as claimed in claim 7, in which R is ethyl.

9. A compound as claimed in claim 7, in which R is iso-propyl.

10. A compound as claimed in claim 7, in which R is allyl.

11. A compound as claimed in claim 7, in which R is cyclohexyl.

12. A compound as claimed in claim 1, in which R is isopropyl and $-N\langle$ is [piperazine-CH₂-CO-NH-CH(CH₃)₂ structure]

13. A compound as claimed in claim 1, in which $-N\langle$ is [piperazine ring]

14. A compound as claimed in claim 13, in which R is ethyl.

* * * * *